United States Patent
Jung et al.

(10) Patent No.: US 7,526,637 B2
(45) Date of Patent: Apr. 28, 2009

(54) ADAPTIVE EXECUTION METHOD FOR MULTITHREADED PROCESSOR-BASED PARALLEL SYSTEM

(75) Inventors: Chang Hee Jung, Daejeon (KR); Dae Seob Lim, Seoul (KR); Jae Jin Lee, Seoul (KR); Sang Yong Han, Seoul (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 175 days.

(21) Appl. No.: 11/453,288

(22) Filed: Jun. 15, 2006

(65) Prior Publication Data
US 2007/0130568 A1    Jun. 7, 2007

(30) Foreign Application Priority Data
Dec. 6, 2005   (KR) ............... 10-2005-0118230
May 16, 2006   (KR) ............... 10-2006-0043645

(51) Int. Cl.
G06F 9/00    (2006.01)
(52) U.S. Cl. .......................... 712/241; 712/42
(58) Field of Classification Search .............. 712/32, 712/42, 229, 241
See application file for complete search history.

(56) References Cited

U.S. PATENT DOCUMENTS

| | | | | |
|---|---|---|---|---|
| 5,093,916 A | * | 3/1992 | Karp et al. | 719/331 |
| 5,151,991 A | * | 9/1992 | Iwasawa et al. | 717/150 |
| 5,165,038 A | * | 11/1992 | Beard et al. | 711/147 |

(Continued)

FOREIGN PATENT DOCUMENTS

EP    691607 A2 *  1/1996

(Continued)

OTHER PUBLICATIONS

Lo, Jack L.; Eggers, Susan J.; Emer, Joel S.; Levy, Henry M.; Stamm, Rebecca L.; and Tullsen, Dean M. "Converting Thread-Level Parallelism to Instruction-Level Parallelism via Simultaneous Multithreading". ACM Transactions on Computer Science, vol. 15, No. 3. Aug. 1997. pp. 322-354.*

(Continued)

Primary Examiner—Aimee J Li
(74) Attorney, Agent, or Firm—Lowe Hauptman Ham & Berner, LLP

(57) ABSTRACT

Provided is a parallel program execution method in which in order to reflect structural characteristics of a multithreaded processor-based parallel system, performance of the parallel loop is predicted while compiling or executing using a performance prediction model and then the parallel program is executed using an adaptive execution method.

The method includes the steps of: generating as many threads as the number of physical processors of the parallel system in order to execute at least one parallel loop contained in the parallel program; by the generated threads, executing at least one single loop of each parallel loop; measuring an execution time, the number of executed instructions, and the number of cache misses for each parallel loop; determining an execution mode of each parallel loop by determining the number of threads used to execute each parallel loop based on the measured values; and allocating the threads to each physical processor according to the result of the determination to execute each parallel loop.

The method significantly improves the performance of the parallel program driven in the multithreaded processor-based parallel system.

13 Claims, 7 Drawing Sheets

U.S. PATENT DOCUMENTS

| | | | |
|---|---|---|---|
| 5,481,723 A * | 1/1996 | Harris et al. | 717/160 |
| 5,560,028 A | 9/1996 | Sachs et al. | |
| 5,852,734 A * | 12/1998 | Komatsu et al. | 717/156 |
| 5,872,963 A * | 2/1999 | Bitar et al. | 712/233 |
| 6,321,373 B1 | 11/2001 | Ekanadham et al. | |
| 6,418,460 B1 * | 7/2002 | Bitar et al. | 718/108 |
| 6,418,531 B1 * | 7/2002 | Nakahara | 712/241 |
| 6,658,655 B1 | 12/2003 | Hoogerbrugge et al. | |
| 6,766,515 B1 * | 7/2004 | Bitar et al. | 718/100 |
| 6,961,925 B2 | 11/2005 | Callahan, II et al. | |
| 2005/0010908 A1 * | 1/2005 | Funk et al. | 717/124 |

FOREIGN PATENT DOCUMENTS

| | | |
|---|---|---|
| JP | 2002-099426 | 4/2002 |
| JP | 2003-167748 | 6/2003 |
| KR | 1020040071446 | 8/2004 |
| KR | 1020040086462 | 10/2004 |
| KR | 1020040091538 | 10/2004 |

OTHER PUBLICATIONS

Jung et al., "Adaptive Execution Techniques for SMT Multiprocessor Architectures", PPoPP, Jun. 15-17, 2005, pp. 236-246.

Lee et al., "Adaptively Increasing Performance and Scalability of Automatically Parallelized Programs", 2005, pp. 203-217.

* cited by examiner

<CACHE STRUCTURE OF SMT PROCESSOR>   <CACHE STRUCTURE OF CMP PROCESSOR>

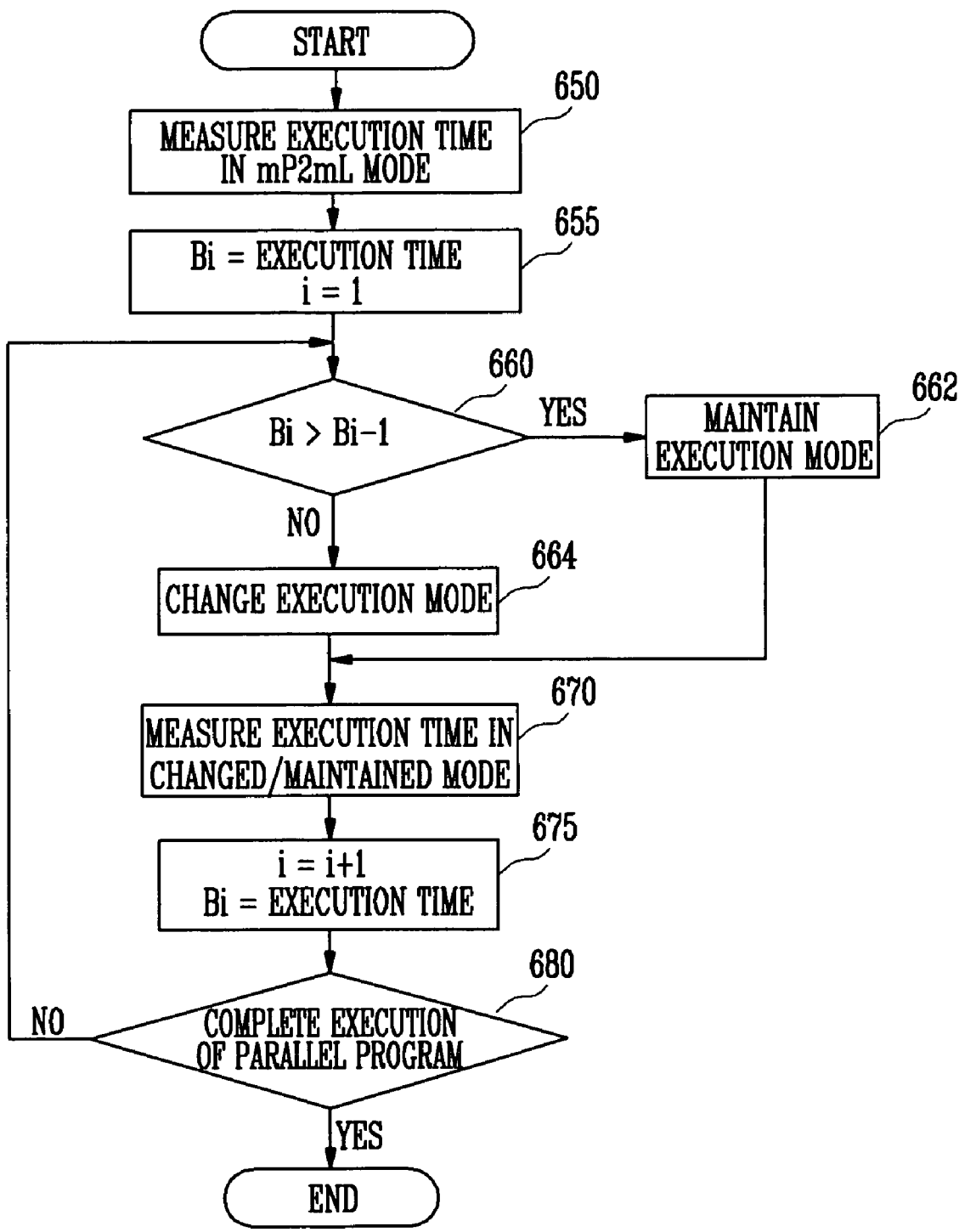

ADAPTIVE EXECUTION METHOD FOR MULTITHREADED PROCESSOR-BASED PARALLEL SYSTEM

CROSS-REFERENCE TO RELATED APPLICATION

This application claims priority to and the benefit of Korean Patent Applications No. 2005-118230 filed Dec. 6, 2005 and 2006-43645 filed May 16, 2006, the disclosure of which is incorporated herein by reference in its entirety.

BACKGROUND

1. Field of the Invention

The present invention relates to an adaptive execution method of a parallel program for a multithreaded processor-based parallel system, and more particularly, to a method of executing a program using an adaptive execution method after predicting the performance of a parallel loop using a performance prediction model when compiling or executing, in order to reflect structural characteristics of a system.

2. Discussion of Related Art

A parallel processor system having m processors should theoretically show an m-fold improvement in execution speed compared to a single processor system. However, in actuality, it cannot achieve such an improvement in performance due to overhead caused by parallel execution, lack of parallelism, and difficulty in parallel programming. Of the above problems, difficulty in parallel programming can be solved by a skilled programming expert, but it requires a considerable amount of time and money to train and use such an expert. In order to solve the problem, a parallelizing compiler has been being developed which parallelizes sequential programs made by the existing sequential programming technique by using a compiler technique.

In order to improve the performance of the parallel program, various optimizing techniques have been applied to the parallelizing compiler. A stumbling block in optimization is that information about a computer in which the parallel program is to be executed, or information about data to be input when the parallel program is executed, is not transferred to the parallelizing compiler. That is, the performance of an algorithm depends on the computer in which it is executed, but it is difficult to get the information during a compiling time. Research has been conducted into improving the performance by optimizing the parallel program or making the parallel program adaptive to an execution environment when the information about the computer in which the parallel program is to be executed or the information about the input data is provided completely, i.e., when the parallel program is executed. The present invention pertains to this field of research.

The present invention relates to a multithreaded processor-based parallel system which is rapidly beginning to dominate the server market. The parallel system is based on a multi-threaded processor which entirely or partially shares a cache such as a simultaneous multi-threading (SMT) or a chip multi-processor (CMP). In such a parallel system, it is very difficult to obtain desired performance by applying the optimizing technique used in the existing parallelizing compiler because it does not reflect structural characteristics of the processor.

A prior article, entitled: "Adaptively increasing performance and scalability of automatically parallelized programs", Jaejin Lee, H. D. K. Moonesinghe, Lecture Notes in Computer Science, vol. 2481, No. 2481, pp. 203-217, December 2005, discloses an adaptive execution method for a symmetric multi-processor and distributed, shared memory parallel system. The article suggests a technique for sequentially executing a certain parallel loop to improve performance when executing the parallel loop in parallel, through a performance prediction of when compiling and several experiential criteria cause performance degradation. However, such a technique also does not reflect structural characteristics of each processor of the parallel system at all, and thus it is not appropriate as a method for achieving higher performance in the multithreaded processor-based parallel system having a shared cache structure.

SUMMARY OF THE INVENTION

The present invention is directed to an adaptive execution method for a multithreaded processor-based parallel system in which structural characteristics of the parallel system are reflected to automatically find performance factors of the parallel system and optimize the performance of the parallel system based on the performance factors.

One aspect of the present invention provides a method of executing a parallel program in a parallel system having a plurality of physical processors, comprising the steps of: generating as many threads as the number of physical processors of the parallel system in order to execute at least one parallel loop contained in the parallel program; by the generated threads, executing at least one single loop of each parallel loop; measuring an execution time, the number of executed instructions, and the number of cache misses for each parallel loop; determining an execution mode of each parallel loop by determining the number of threads used to execute each parallel loop based on the measured values; and allocating the threads to each physical processor according to the result of the determination to execute each parallel loop.

The step of determining the execution mode may comprise the steps of: (a) determining whether to predict the computation amount of each parallel loop while compiling the parallel program; (b) determining, when the computation amount of each parallel loop is predicted while compiling the parallel program, whether the predicted computation amount is smaller than a critical value; (c) determining, when the computation amount of each parallel loop is not predicted while compiling the parallel program, or the predicted computation amount is larger than the critical value, whether a computation amount predicted through the number of executed instructions measured is smaller than a critical value; (d) obtaining, when the number of executed instructions is greater than the critical value, a number of cache misses per instruction (MPI) value based on the number of executed instructions and the number of cache misses and determining whether the MPI value is greater than a critical value; (e) obtaining, when the MPI is smaller than the critical value, a number of cycles per instruction (CPI) value based on the number of executed instructions and the execution time and determining whether the CPI value is smaller than a critical value; and (f) determining, when the CPI value is greater than the critical value, whether the number of executed instructions measured is smaller than a critical value.

BRIEF DESCRIPTION OF THE DRAWINGS

The above and other features and advantages of the present invention will become more apparent to those of ordinary skill in the art by describing in detail exemplary embodiments thereof with reference to the attached drawings in which:

FIG. 6B is a flowchart illustrating an execution method in an mPmL-mP2mL mode according to the exemplary embodiment of the present invention;

DETAILED DESCRIPTION OF EXEMPLARY EMBODIMENTS

Hereinafter, an exemplary embodiment of the present invention will be described in detail. However, the present invention is not limited to the embodiments disclosed below, but can be implemented in various forms. Therefore, the present embodiment is provided for complete disclosure of the present invention and to fully inform the scope of the present invention to those of ordinary skill in the art.

Figure 1A:
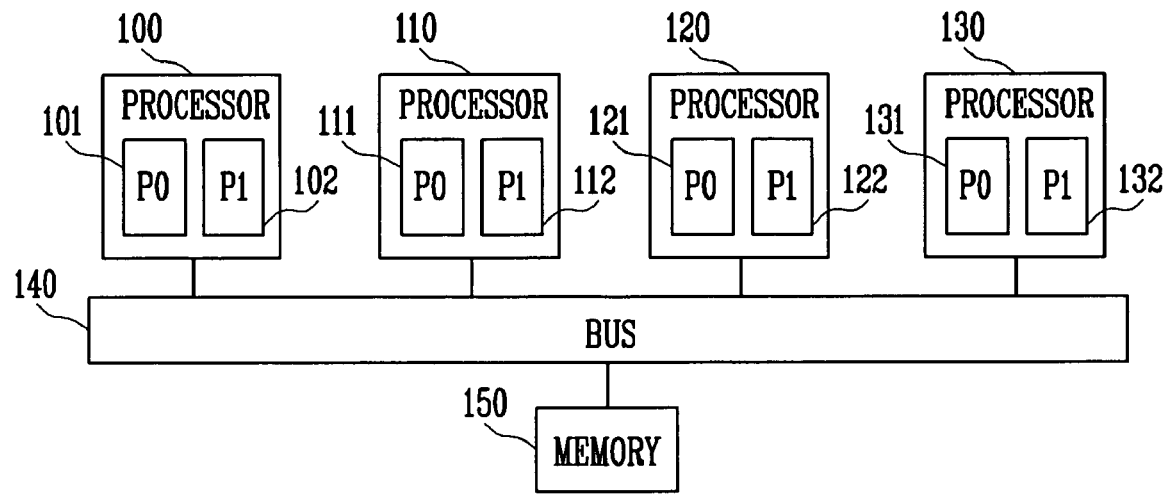
FIG. 1A is a block diagram illustrating a multithreaded processor-based parallel system according to an exemplary embodiment of the present invention.

FIG. 1A is a block diagram illustrating a multithreaded processor-based parallel system according to an exemplary embodiment of the present invention.

Referring to FIG. 1A, four physical processors 100, 110, 120, and 130 which share a memory 150 and are connected to a bus 140 are provided. The physical processors have two logical processors 101 and 102, 111 and 112, 121 and 122, and 131 and 132, respectively. The parallel system having such a configuration looks to have eight logical processors.

Figure 1B:
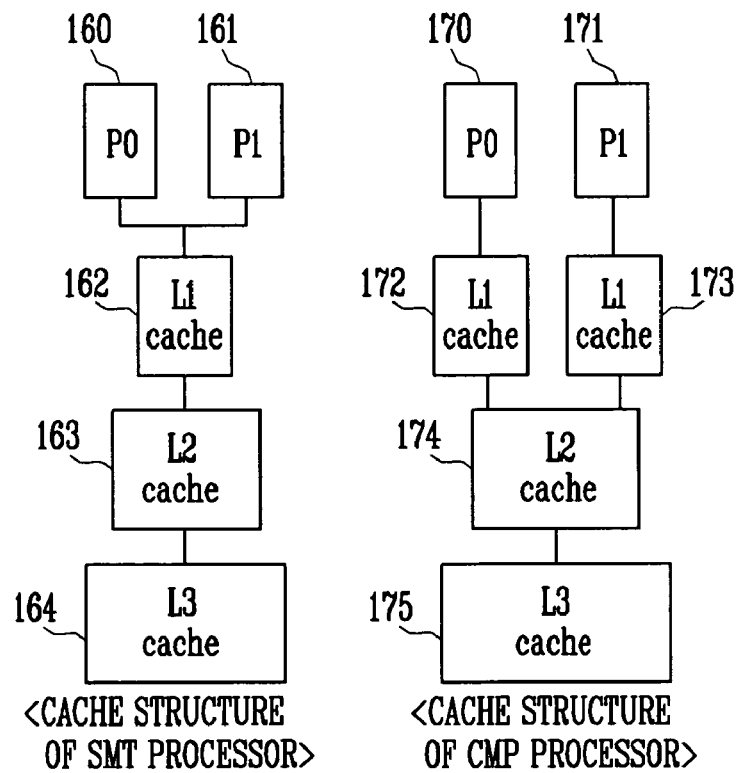
FIG. 1B is a block diagram illustrating cache structures of simultaneous multithreading (SMT) and a chip multi-processor (CMP) as a representative multithreaded processor.

FIG. 1B is a block diagram illustrating cache structures of simultaneous multithreading (SMT) and a chip multi-processor (CMP) as a representative multithreaded processor.

Each physical processor of the parallel system is a multi-threaded processor such as SMT and CMP and has L1 caches 162, 172, and 173, L2 caches 163 and 174, and L3 caches 164 and 175. These caches are entirely or partially shared by the two logical processors of the physical processor depending on a processor type. Here, L1, L2, and L3 represent layers of a cache memory in the computer. The L1 cache (abbreviation of level-1) is a memory arranged in a core inside a central processing unit (CPU), and the L2 cache (abbreviation of level-2) is a memory arranged in a main board or an extension card outside the CPU. Here, the L2 cache may be arranged inside the CPU according to an arrangement of the L3 cash. The L3 cache (abbreviation of level-3) is arranged outside the CPU. Using these caches can save considerable time compared to the case of the processor reading data necessary for an operation from a random access memory (RAM).

Referring to FIG. 1B, the logical processors 160 and 161 of the SMT processor share the L1 cache 162, and the logical processors 170 and 171 of the CMP processor have their own respective L1 caches 172 and 173 and share the L2 cache 174.

Figure 2:
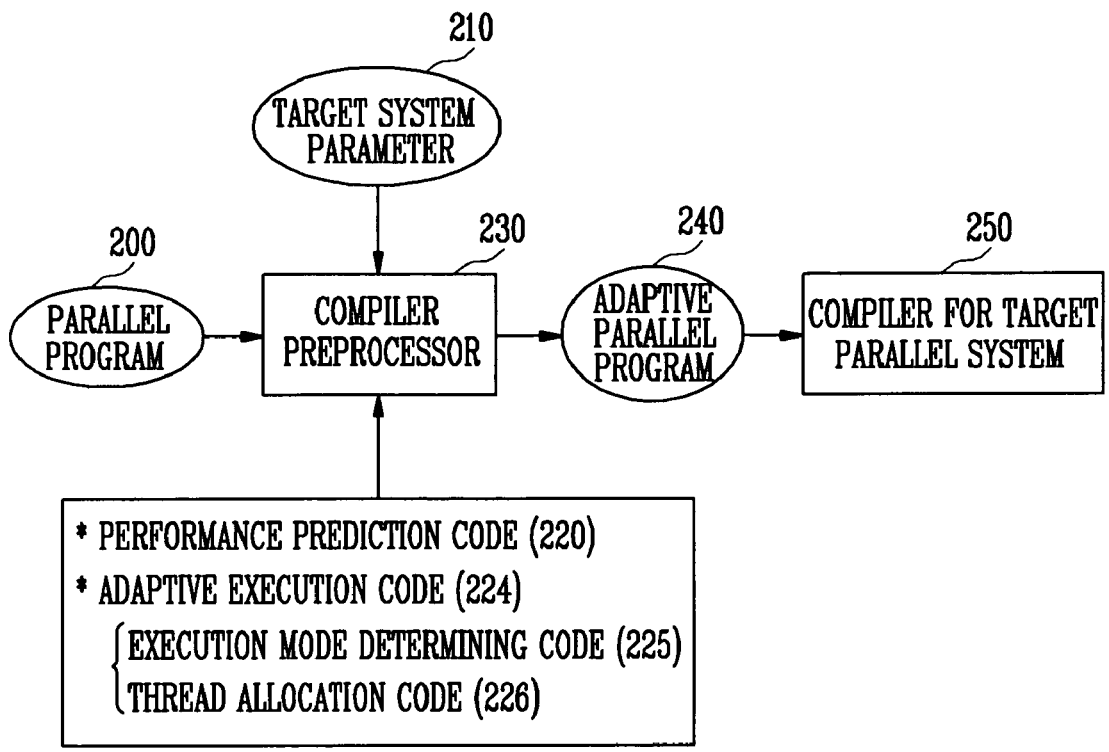
FIG. 2 is a conceptual diagram illustrating a basic principle for optimizing a parallel program according to the exemplary embodiment of the present invention.

FIG. 2 is a conceptual diagram illustrating a basic principle for optimizing a parallel program according to the exemplary embodiment of the present invention.

Referring to FIG. 2, a parallel program 200 automatically or manually parallelized is input to a compiler preprocessor 230, and the compiler preprocessor 230 receives target system parameters 210 specific to a target parallel system and inserts a performance prediction code 220 and an adaptive execution code 224 into the parallel program 200 to thereby output an adaptive parallel program 240. The adaptive parallel program 240 is compiled by a typical compiler 250 which generates a code for the target parallel system. These components are described in detail below.

The parallel program 200 is a program whose configuration is parallelized for the processors of the parallel system to execute a sequential program in parallel. In terms of the inside of the sequential program, focusing on a loop structure whose code amount is small but occupies most of the execution time, the sequential program source is parallelized by analyzing a data dependence relationship between sentences in the loop structure to determine whether the corresponding loop can be parallelized or not and inserting a parallelizing indicator of an OpenMP standard if possible.

In the exemplary embodiment of the present invention, the OpenMP parallel programming model is used as a parallel execution model and thus will be briefly described below. The OpenMP is an application programming interface for parallel programming having high scalability in a shared memory system, and it is configured based on an indicator. It dynamically configures a routine and provides a parallelization technique, and it is high in scalability and enables easy code making. A programmer makes a sequential program and then inserts an OpenMP indicator into a portion which needs to be parallelized, and the OpenMP compiler recognizes the parallelizing indicator to take appropriate action to convert a sequential program into a parallel program, and then executes the parallel program in parallel. As a result, parallel loops are generated by parallelizing the loop structure of the sequential program and threads execute the corresponding parallel loops.

The OpenMP basically follows a master-slave thread model. The program made by the OpenMP starts by a single thread and is executed by plural threads when it meets a certain indicator. The single thread is called a master thread, and plural threads are called slave threads. Each of the threads performs a portion which needs to be parallelized and reports a result to the master thread when the routine is completed. This will be clearly understood with reference to FIG. 3.

Figure 3:
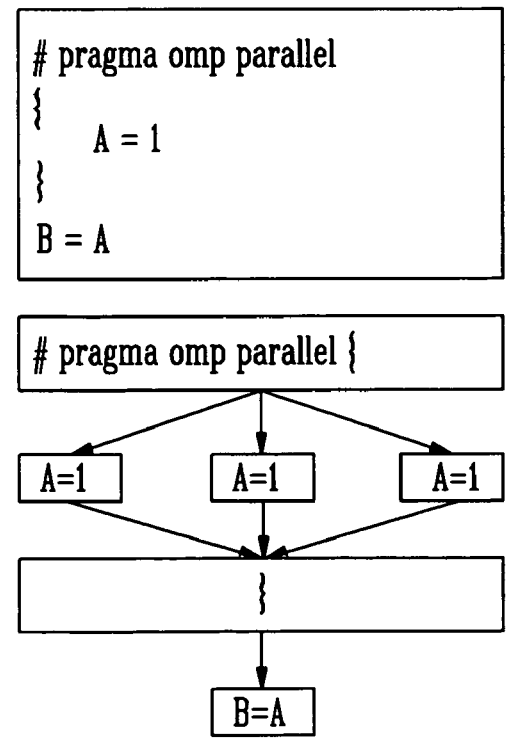
FIG. 3 is a diagram illustrating a programming execution model of an OpenMP model used in the exemplary embodiment of the present invention.

FIG. 3 is a diagram illustrating a programming execution model of the OpenMP model used in the exemplary embodiment of the present invention.

Referring to FIG. 3, a single thread operates, and when it meets an indicator "#pragma omp parallel", three slave threads are generated. Each slave thread executes a loop called "A=1" and reports the execution result to the master thread. The master thread collects the reports to finish the corresponding parallel loop and executes the next parallel loop. Consequently, it is understood that the parallelized portion is a portion contained in parentheses of the "#pragma omp parallel". That is, the entire code is not executed in parallel by plural threads from the beginning, but one thread executes the program in the beginning and plural threads are generated to execute the program in parallel when necessary.

Figure 4:
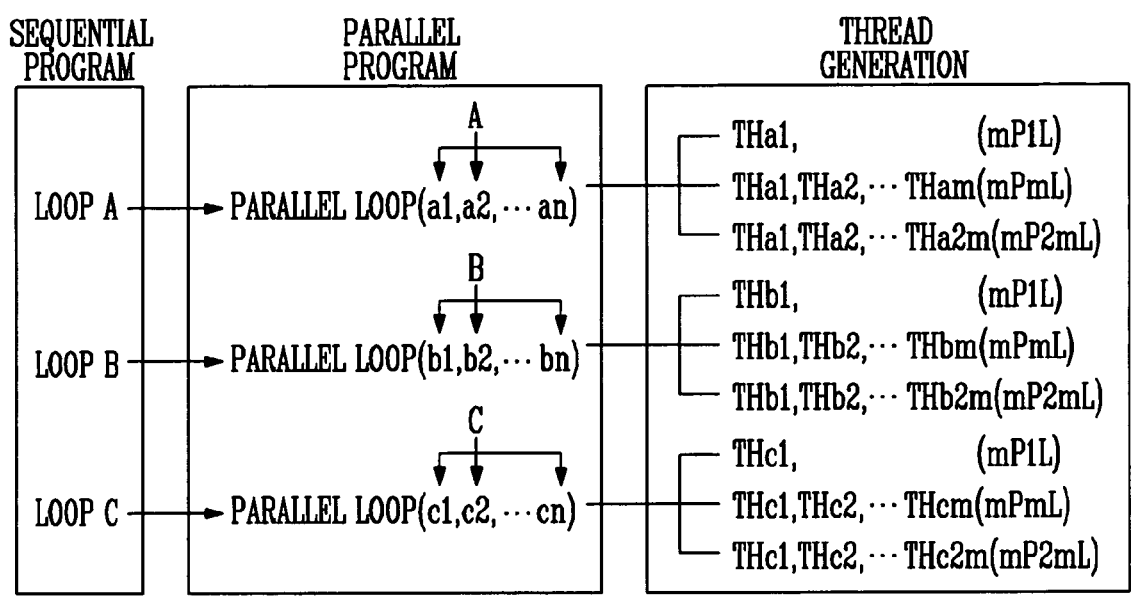
FIG. 4 is a diagram illustrating a relationship among the sequential program, the parallel program and the thread generation according to the exemplary embodiment of the present invention.

FIG. 4 is a diagram illustrating a relationship among the sequential program, the parallel program, and thread generation according to the exemplary embodiment of the present invention.

Referring to FIG. 4, a sequential program containing a plurality of loops A, B and C is converted into a parallel program containing a plurality of parallel loops which are generated by parallelizing the loops A, B and C. For example, the loop A is converted into the parallel loop A parallelized in the form of a1, a2, . . . , an. Here, a1, a2, . . . , an which constitute the parallel loop A are referred to as single loops. The loops A, B, and C are parallelized to generate the parallel program. For example, if the loop A is a loop whose number of iterations is 100 and the parallel system has four physical processors, the parallel loop A is generated for each physical processor to perform execution 25 times, and the generated parallel loop A contains single loops a1, a2, a3, and a4, each of whose number of executions is 25.

A thread is generated to execute the parallel loops, and each thread executes single loops in the parallel loop allocated to itself in parallel. In the exemplary embodiment of the present invention, the number of threads to be generated depends on the number of physical processors contained in the target parallel system. If m physical processors are provided, one, m, or 2m threads are generated to execute the parallel loops. As described above, the thread is generated by inserting the indicator in the case of the OpenMP model.

Thus, if one thread is generated as shown in FIG. 4, one thread THa1 sequentially executes all single loops in the parallel loop, and if m threads are generated, m threads THa1 to THam execute single loops allocated to them in parallel. In the case where 2m threads are generated, a similar execution method is employed.

As described above, before input to the preprocessor, the parallel program contains the parallel loops which are processed in parallel by the processors of the parallel system and contains the indicator for generating a plurality of threads which execute the parallel loops.

Meanwhile, the target system parameter 210 relates to a characteristic of the parallel system in which the parallel program is to be executed, and contains information about a configuration and characteristic of the system processor and information about whether the memory is shared or not. For example, the target system parameter 210 contains information about whether the target parallel system is the SMT type or the CMP type, information about the number of physical processors, and information about a cache configuration. In the exemplary embodiment of the present invention, the execution method of the parallel program depends on a characteristic of the parallel system in which the parallel program is to be executed, and thus input of the parameters is necessary.

The preprocessor 230 receives the parallel program 200 and the target system parameter 210 to output the adaptive parallel program 240. At this time, the preprocessor 230 inserts the performance prediction code (i.e., instrumentation code) 220 for collecting the performance evaluation factors of the respective parallel loops and the adaptive execution code 224 into the parallel program 200.

The performance prediction code 220 measures an execution time of during a single invocation of a loop, the number of executed instructions, and the number of cache misses. A performance counter of the processor is used to collect the performance evaluation factors, and an invocation to read the performance counter is called a decision run. The performance counter is provided as a measure for measuring system performance and measures performance of a cash, a physical/logical disk, a memory, a network interface, a processor, a thread, or the like. A value of the performance counter continuously increases and it is not reset to "0". Thus, in order to evaluate the performance using the performance counter, start and end counter values of a predetermined time period are read, and the difference there between is computed by a special method.

The adaptive execution code 224 contains an execution mode determining code 225 for determining an execution mode of the respective parallel loops by determining the number of threads used to execute the respective parallel loops based on the measured values, and a thread allocation code 226 for allocating the threads to the respective logical processors according to the result of the determination.

In order to describe a role of the adaptive execution code 224, operations performed by the respective threads of the parallel program in the parallel system are first explained below.

The notation, mPnL is introduced to represent a mapping of the thread and the processor. m denotes the number of physical processors, and n denotes the number of logical processors. n is also used to represent the total number of threads used. Here, n has a value of 1, m or 2m.

Returning to FIG. 1, the parallel loop can be executed in a 4P1L, a 4P4L, or a 4P8L mode since four physical processors are provided. For example, 4P4L means that four threads are mapped to four physical processors, and each thread is allocated to one logical processor P0 101, 111, 121, 131 of the two logical processors of each physical processor. 4P8L means that eight threads are allocated to four physical processors, and a one-to-one correspondence is realized between the logical processors of each physical processor and the threads. In the 4P1L execution mode, only one thread is executed in one logical processor of the system. That is, the parallel loop is sequentially executed.

The execution mode of the parallel loop depends on how a plurality of threads for executing the parallel loops in the parallel program are allocated to the logical processor in the parallel system. In the exemplary embodiment of the present invention, the parallel loop is executed in the form of an mP1L, an mPmL, or an mP2mL mode.

Accordingly, the adaptive execution code 224 has the execution mode determining code 225 for selecting the execution mode suitable for each parallel loop.

The procedure for determining the execution mode determining code 225 is briefly described below and will be described in more detail later with reference to filtering steps 500 to 554. In brief, a computation amount of the parallel loop predicted in the step of compiling the parallel program is measured to determine whether to execute in the mP1L, and a computation amount determined in an execution step is measured to determine an execution mode. At this time, the parallel loop of the first step is executed in the mPmL mode, and the execution time, the number of executed instructions and the number of cache misses are measured through the performance prediction code. Then, through the measured value, one among the mP1L mode, the mPmL mode, the mP2mL mode, an mP1L-mPmL adaptive execution mode, and an mPmL-mP2mL adaptive execution mode is selected.

Meanwhile, the adaptive execution code has the thread allocation code 226 for allocating the thread to the logical processor to be suitable for the execution mode when the execution mode of the program is determined or the execution mode needs to be changed according to the result of the determination.

As described above, an appropriate number of threads can be generated by inserting the indicator since the OpenMP generates the thread by using the indicator.

The thread allocation code 226 controls a correlation between the logical processor and the thread to be suitable for the number of threads using a system call of the operating system. Here, the system call means that the process requests a service to the operating system and plays the role of a discussion window between the process and the operating system. The operating system provides a system call interface which is provided to a user process in the form of a head file. The user process accesses a kernel directly or using a library, and a user mode is switched to an operating system mode at the moment when the system call is used.

For example, in the parallel system having four physical processors, when the execution mode is changed from the 4P4L to the 4P8L, i.e., when the number of threads is changed from 4 to 8, four new threads are generated, and the system call is used to control the system to use all but four logical processors.

Meanwhile, the adaptive parallel program 240 is the program having the performance prediction code 220 and the adaptive execution code 224 inserted by the preprocessor 230, and it becomes an executable program after being compiled by the compiler 250. Operations of the inserted codes are described below with reference to FIG. 5.

Figure 5:
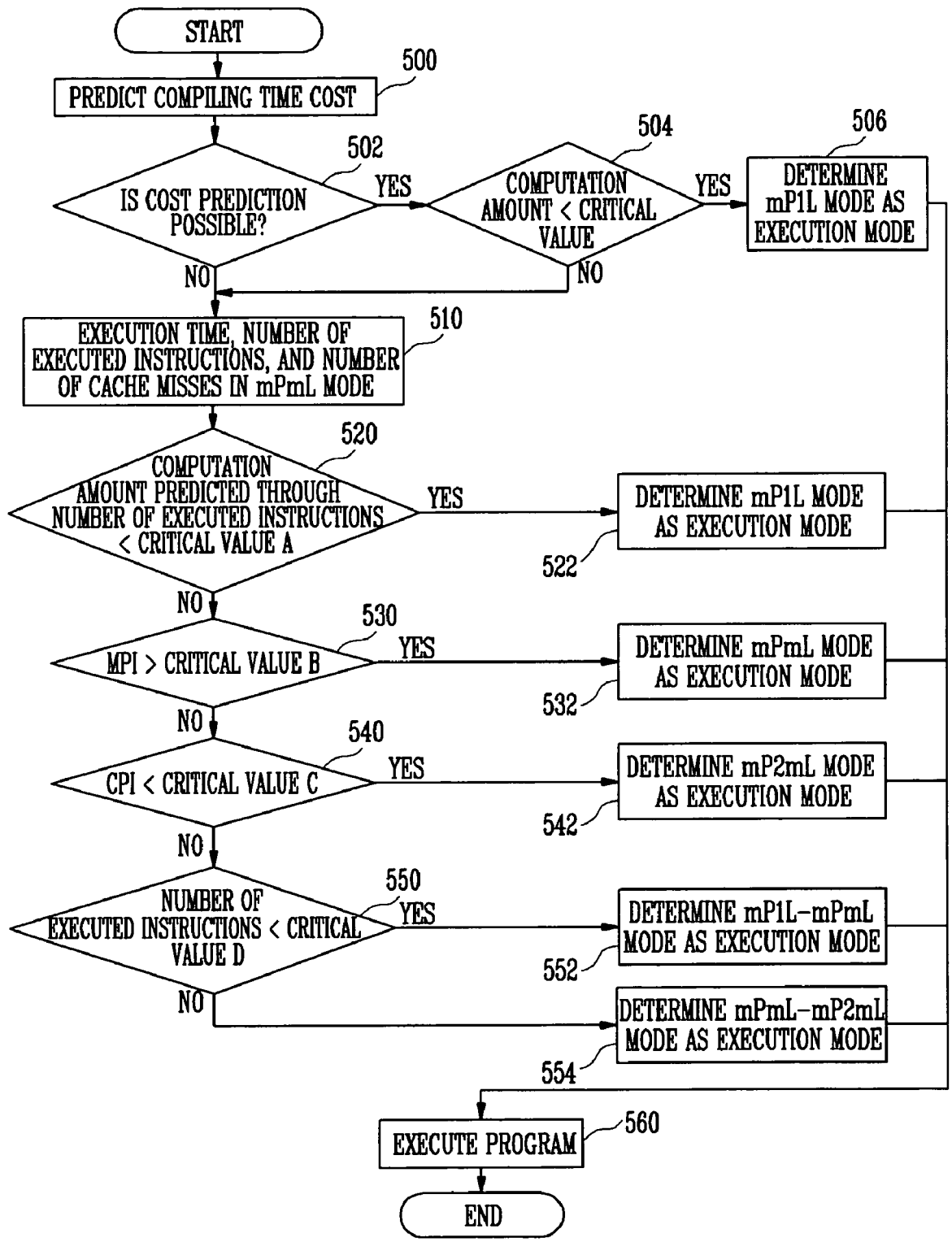
FIG. 5 is a flowchart illustrating a filtering method for determining an execution mode according to the exemplary embodiment of the present invention.

FIG. 5 is a flowchart illustrating a filtering method for determining the execution mode according to the exemplary embodiment of the present invention. The filtering method is performed by the execution mode determining code 225 of the adaptive execution code 224 inserted by the preprocessor.

Referring to FIG. 5, a cost during a compiling time is predicted to select the parallel loop which is to be executed in the mP1L mode, i.e., the sequential execution mode (step 500).

Step 500 of predicting the compiling time cost is a step of filtering loops performing fewer computations than a parallel loop overhead, and determining whether there is a performance improvement when the parallel loop of the program is executed in parallel compared to the case where it is sequentially executed. If the parallel loop has a speed increase rate (i.e., speedup=sequential execution time/parallel execution time) that is greater than "1", it means that it is an efficient parallel loop. Otherwise, it is an inefficient parallel loop.

In step 500, inefficient parallel loops are identified by an insufficient amount of computation of the parallel loop during the compiling time before execution of the program, and such inefficient parallel loops are executed in the mP1L mode. This is done because such parallel loops perform fewer computations than the parallel loop overhead and so it is disadvantageous to execute them in parallel.

Meanwhile, when the parallel loop is made up of multiple internal loops, since it is difficult to determine the number of iterations of the internal loops before executing the external loop, it is difficult to get a cost function whose factor is determined by the number of iterations of the external and internal loops. Thus, it is determined while compiling whether to predict the computation amount of each parallel loop or not, and if not, the process goes to step 510 of predicting an execution time cost, which will be described later (step 502).

If it is determined that a cost of the parallel loop can be predicted during the compiling time, a critical value for the computation amount of the parallel loop is determined, and if the computation amount is smaller than the critical value, the execution mode of the corresponding parallel loop is determined as the mP1L mode (step 506). Otherwise, the parallel loop is passed to step 510 of predicting an execution time cost (step 504).

The exemplary embodiment of the present invention suggests a simple cost predicting model and can predict the computation amount W through a cost function comprised of the number of uses of several system factors. Considered are the number of uses of system factors such as iteration ($n_i$), allocation ($n_a$), addition of real numbers ($n_{f_{add}}$), multiplication of real numbers ($n_{f_{mul}}$), subtraction of real numbers ($n_{f_{sub}}$), division of real numbers ($n_{f_{div}}$), internal function invocation ($n_{f_i}$), system function invocation ($n_{f_s}$), and user-defined function invocation ($n_{f_u}$). Accordingly, the computation amount $w_i$ predicted by one iteration is defined by Equation 1:

$$w_i = n_a \cdot c_a + n_{f_{add}} \cdot c_{f_{add}} + n_{f_{mul}} \cdot c_{f_{mul}} + n_{f_{sub}} \cdot c_{f_{sub}} + n_{f_{div}} \cdot c_{f_{div}} + n_{f_i} \cdot c_{f_i} + n_{f_s} \cdot c_{f_s} + n_{f_u} \cdot c_{f_u}$$ [Equation 1]

Here, $c_{op}$ denotes a single operation related to a corresponding op such as allocation, addition of real numbers, multiplication of real numbers, and subtraction of real numbers. The total predicted cost of a single invocation of the loop is defined by Equation 2:

$$W(n_i) = n_i \cdot W_i$$ [Equation 2]

The reason why $n_i$ is added to Equation 2 is because it is difficult to know the exact number of iterations of the loop while compiling. When the computation amount of the loop having branches is predicted, an equal weight is given to each branch.

Figure 7:
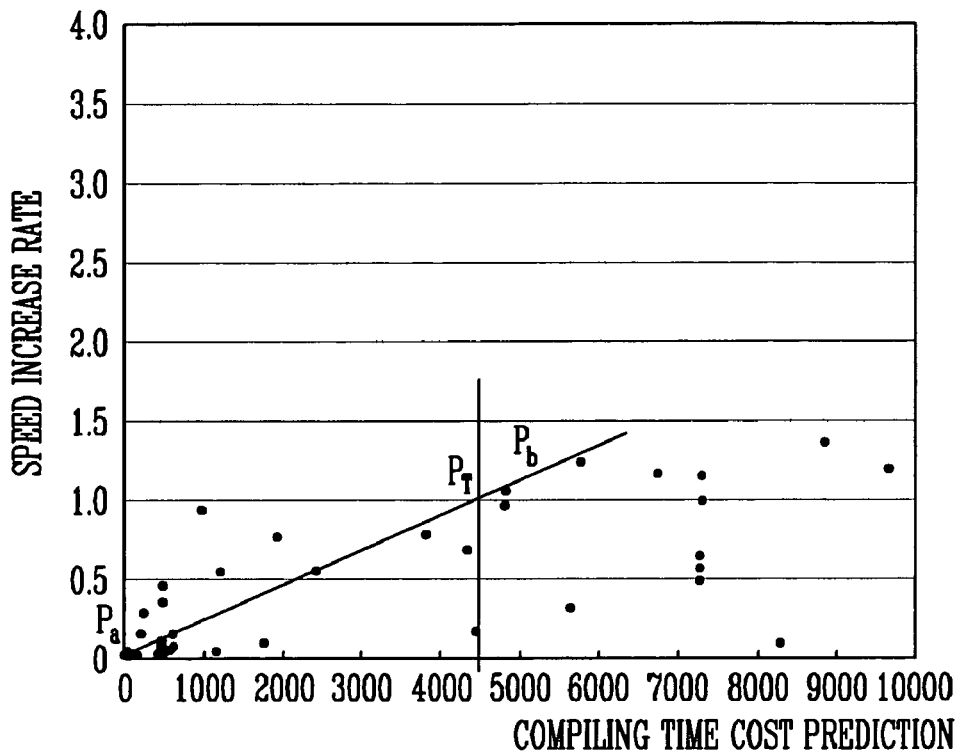
FIG. 7 is a graph illustrating a method for determining a critical value for a predicted computation amount according to the exemplary embodiment of the present invention.

FIG. 7 is a graph illustrating a method for determining the critical value for the predicted computation amount according to the exemplary embodiment of the present invention. The critical value is experientially determined, and a plurality of representative parallel programs containing several kinds of parallel loops are first executed.

Next, a sequential execution time in the mP1L mode and a parallel execution time in the mPmL mode are measured, and then speed increase rate is graphed versus predicted cost of each loop.

In FIG. 7, the number of physical processors is 4, i.e., m=4. Referring to FIG. 7, a solid line is drawn from a point $p_a$ having a minimum predicted cost to a point $p_b$ where the predicted cost is least among points where the speed increase rate is greater than 1. A point of intersection between the solid line and a horizontal line representing the speed increase rate of 1.0 is determined as the critical value. Then, parallel loops performing fewer computations than the critical value are executed in the mP1L mode.

If it is determined in step 502 that the computation amount of each parallel loop is unpredictable or the predicted computation amount is greater than the critical value (step 504), parameters determined during execution time are measured (step 510). Here, the parameters include the execution time spent to execute the single loop in the parallel loop, the number of instructions executed, and the number of cache misses during execution.

As the execution time, a time spent to completely execute each parallel loop is measured by the performance counter of the processor as described above.

As the number of executed instructions and the number of cache misses during execution, the number of instructions executed after completely executing one among single loops which constitute each parallel loop, and the number of cache misses during execution, are measured by the performance counter of the processor.

Step 510 processes inefficient loops which cannot be dealt with in step 500 of predicting the compiling time cost due to parameters to be determined during execution of the compiled parallel program. The number of instructions executed in the loop is proportional to the computation amount thereof. Thus, the number of instructions (i.e., graduated instructions) executed by the first invocation of the parallel loop is used.

The number of executed instructions is measured by the performance prediction code 220 inserted by the preprocessor 230. When the computation amounted predicted by the number of executed instructions is smaller than a critical value, the execution mode of the corresponding parallel loop is determined as the mP1L mode (step 522).

The critical value is experientially determined, and the determining method is similar to the method in the compiling time cost prediction model. Parallel loops remaining after passing through the above procedures proceed to the next step 520.

Parallel loops remaining after filtering in steps 500 to 520 are greatly affected by interference and cache collision between the logical processors (threads). This is at least because the parallel loops are executed in at least two logical processors. In order to distinguish the loops greatly affected by cache collision between the logical processors, the number of cache misses per instruction (i.e., misses per instruction (MPI)) is used (step 530).

A cache miss is a phenomenon in which there is no data in a cache memory when the processor requests data, and it happens between processors sharing the same cache memory. In terms of a memory access rate, cache misses greatly lower system performance since data should be read from the memory. Thus, a loop having a high MPI in the mPmL mode is likely to have a high MPI in the mP2mL mode, because the actual cache capacity of each thread in the mP2mL mode is half that in the mPmL mode. For this reason, it is not preferable to execute such loops in the mP2mL mode.

A technique suggested by the present invention is that the first execution of each parallel loop is performed in the mPmL mode and the MPI is measured. The MPI is obtained by performing an operation for dividing the number of cache misses, which is measured after completely executing one among single loops which constitute each parallel loop, by the number of executed instructions, as described above. When the measured MPI is greater than a critical value, the execution mode of the corresponding parallel loop is determined as the mPmL mode (step 532). Here, the critical value is experientially determined similarly to the previous step.

Figure 8:
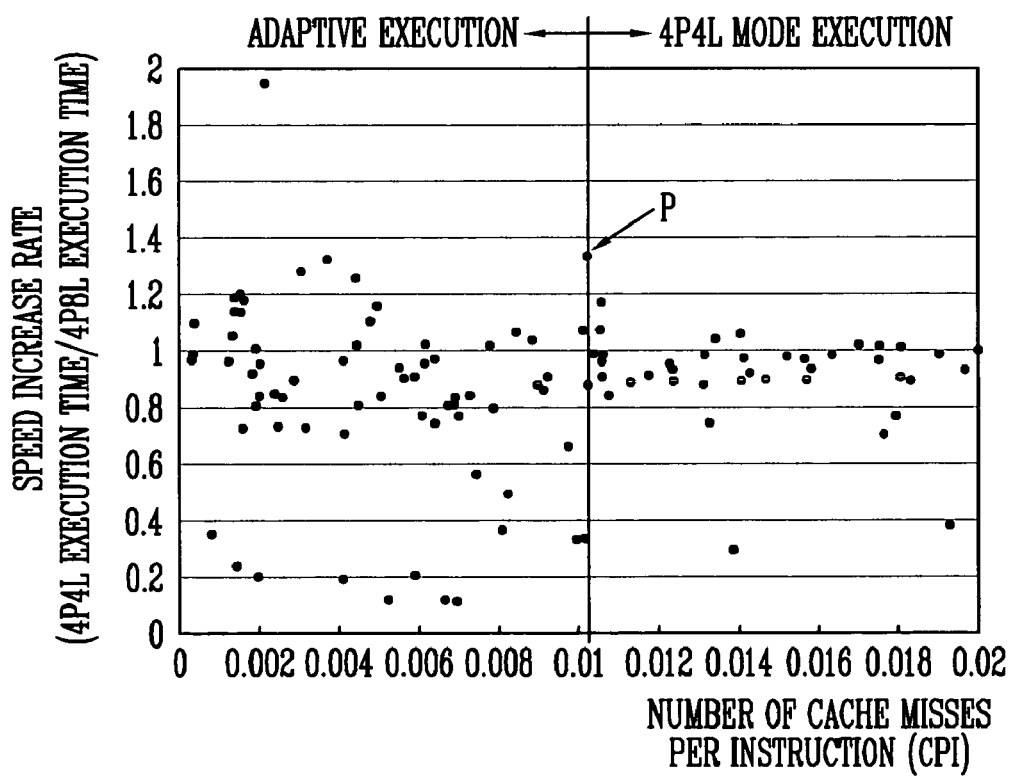
FIG. 8 is a graph illustrating a method for determining a critical value of an MPI according to the exemplary embodiment of the present invention.

FIG. 8 is a graph illustrating a method for determining the critical value of the MPI according to the exemplary embodiment of the present invention.

Referring to FIG. 8, a plurality of representative parallel programs containing several kinds of parallel loops are executed. For each loop of the parallel program, the execution time and the MPI in both the mPmL mode and the mP2mL mode are measured, and then the speed increase rate (i.e., mPmL execution time/mP2mL execution time) is graphed versus the measured MPI of each loop. A point P located rightmost from the y axis among points for which the minimum speed increase rate is greater than 1.2 is selected, and the MPI value corresponding to the point P is used as the critical value. In FIG. 8, the parallel loops located in the right of the point P are candidates for the mPmL mode. Thus, the loops having a greater MPI value than the critical value are executed in the mPmL mode.

Meanwhile, the parallel loops determined experimentally mostly show good performance in the mPmL mode, but some loops sometimes show better performance in the mP2mL mode. In order to filter such loops, the number of cycles per instruction (CPI) is used (step 540).

The CPI means the number of clock cycles of the computer generated while the instruction is executed by the processor. It partially depends on the MPI, but it is useful in measuring interference between instructions output from the two logical processors contained in the single physical processor. The CPI value is obtained by dividing the measured execution time by the number of executed instructions.

Since the greater the interference between the logical processors, the greater the CPI value, when the CPI is smaller than a critical value in the mPmL mode, the execution mode of the corresponding parallel loop is determined as the mP2mL mode (step 542). The method for obtaining the critical value is similar to the method for obtaining the critical value of the MPI.

Parallel loops remaining after filtering in steps 500 to 542 are subjected to steps 550 to 554 which are collectively referred to as an adaptive execution step of changing the execution mode by measuring the number of executed instructions and the execution time of each parallel loop.

In the adaptive execution step 550, the parallel loop is firstly executed in the mPmL mode and the number of executed instructions and the execution time are measured.

The number of executed instructions is measured after completely executing one among single loops which constitute each parallel loop as described above, and the execution time is obtained by measuring a time spent to execute the whole parallel loop containing the single loop.

The mP1L-mPmL mode or the mPmL-mP2mL mode is selected depending on the number of executed instructions.

The mP1L-mPmL mode and the mPmL-mP2mL mode are performed such that when one parallel loop is repeatedly executed in the program, the execution time spent to execute the whole parallel loop is measured and compared to an immediately previous execution time to change the execution mode. In the mP1L-mP1L mode, the mP1L mode or the mPmL mode is selected as the execution mode, and in the mPmL-mP2mL mode, the mPmL mode or the mP2mL mode is selected as the execution mode.

When the number of executed instructions measured is smaller than a critical value, the execution mode of the corresponding parallel loop is determined as the mP1L-mPmL mode (step 552). Otherwise, it is determined as the mPmL-mP2mL mode (step 554). A method for obtaining the critical value is similar to that in the execution time cost prediction model.

Figure 6A:
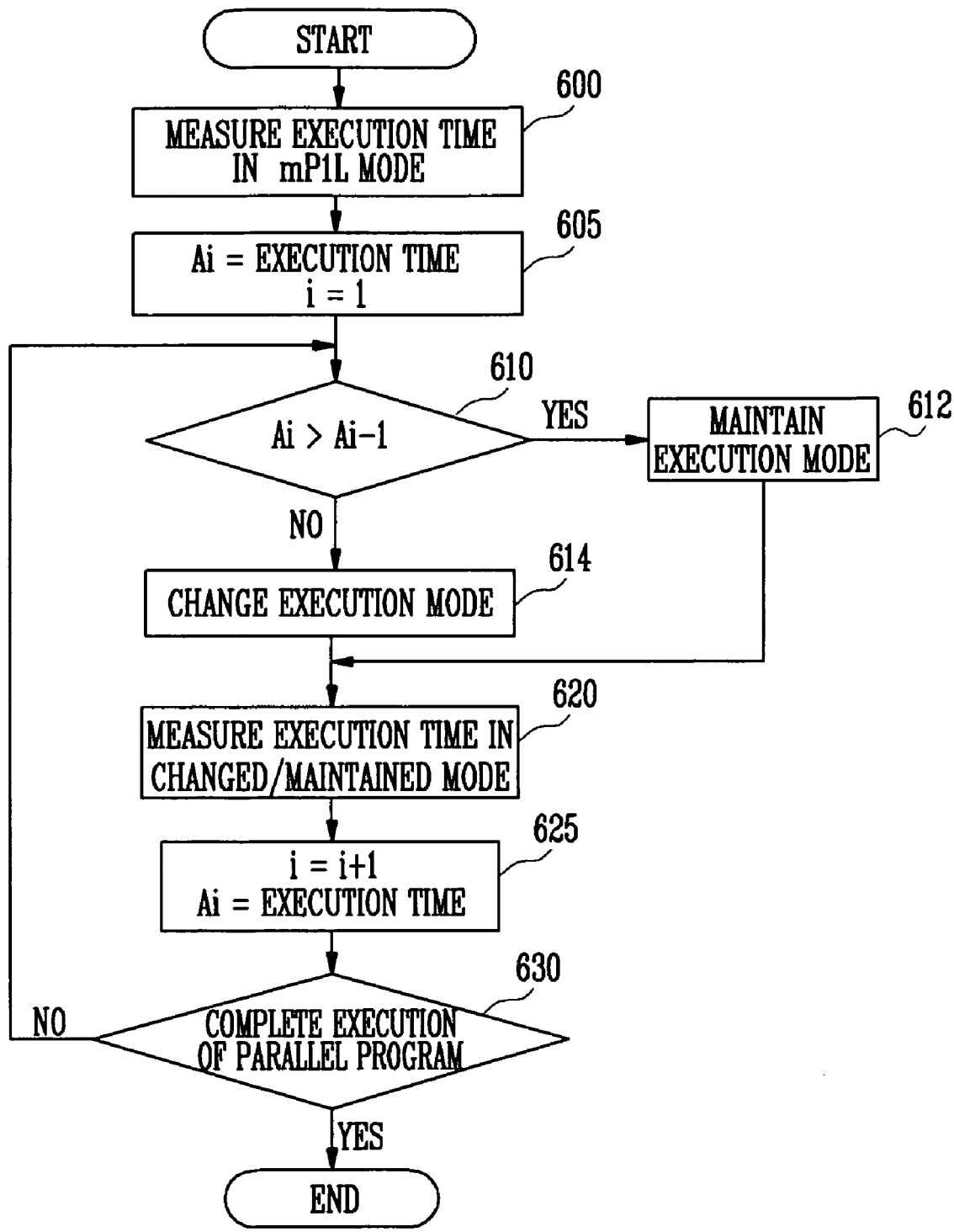
FIG. 6A is a flowchart illustrating an execution method in an mP1L-mPmL mode according to the exemplary embodiment of the present invention.

FIGS. 6A and 6B are flowcharts illustrating execution methods in the mP1L-mPmL mode and the mPmL-mP2mL mode, respectively, according to the exemplary embodiment of the present invention.

Referring to FIG. 6A, the execution mode of the corresponding parallel loop is changed to the previous execution mode and another execution mode, and the execution times are measured while executing the parallel loop in the changed execution modes (step 600).

This is done in order to select the execution mode having a shorter execution time for the next execution. Specifically, the execution time in the mPmL mode is measured since the first execution of each parallel loop is performed in the mPmL mode, the execution mode in the mP1L mode is measured after changing the execution mode to the mP1L mode when the same parallel loop is invoked again to be executed, and the two execution times in the two execution modes are compared.

The following step 605 is a step of inputting the measured execution time to a specific variable.

The measurement is compared to the execution time of the parallel loop in the execution mode of before the mode change (step 610).

In FIG. 6A, A1 denotes the execution time of the mP1L mode, and A0 denotes the execution time in the previous mode, i.e., the mPmL mode. Here, as a value of A0, an execution time value measured in step 510 is used as is.

When the execution time in the new execution mode is shorter than the execution time in the execution mode of before the mode change, the execution mode is changed to the new execution mode (step 614). Otherwise, the execution mode is not changed (step 612).

The parallel loop is executed in the determined execution mode, and the execution time of the corresponding parallel loop is measured (step 620). This is done in order to compare the execution times of the respective execution modes to thereby determine whether to change the execution mode or not for the next execution of the corresponding parallel loop.

The following step 625 involves expression of an algorithm for continuously performing the above-described steps.

The above-described steps 610 to 625 are performed until execution of the parallel program is finished (step 630).

Referring to FIG. 6B, the general flow of FIG. 6B is similar to that of FIG. 6A except that the execution mode is changed between the mPmL mode and the mP2mL mode.

First, the execution mode of the corresponding parallel loop is changed and the execution times are measured while executing the parallel loop in the different execution modes (step 650).

This is done in order to select the execution mode having a shorter execution time for the next execution. Specifically, the execution time in the mPmL mode is measured since the first execution of each parallel loop is performed in the mPmL mode, the execution mode in the mP2mL mode is measured after changing the execution mode to the mP1L mode when the same parallel loop is invocated again to be executed, and the two execution times in the two execution modes are compared.

The next step 655 is a step of inputting the measured execution time to a specific variable.

The measurement is compared to the execution time of the parallel loop in the execution mode of before the mode change (step 660).

In FIG. 6B, B1 denotes the execution time in the mP2mL mode, and B0 denotes the execution time in the previous mode, i.e., the mPmL mode. Here, the value of B0, an execution time value measured in step 510, is used "as is".

When the execution time in the new execution mode is shorter than the execution time in the execution mode of before the mode change, the execution mode is changed to the new execution mode (step 664). Otherwise, the execution mode is not changed (step 662).

The parallel loop is executed in the determined execution mode, and the execution time of the corresponding parallel loop is measured (step 670). This is done in order to compare the execution times of the respective execution modes to thereby determine whether to change the execution mode or not for the next execution of the corresponding parallel loop.

The next step 675 involves expression of an algorithm for continuously performing the above described steps.

The above-described steps 660 to 675 are performed until execution of the parallel program is finished (step 680).

In summary, the mP1L-mPmL mode or the mPmL-mP2mL mode is the execution mode in which the execution time is measured whenever each parallel loop is executed, the measured execution time is compared to the execution time in the firstly executed execution mode to determine whether the execution time is shorter or not, to thereby determine whether to change the execution mode when the corresponding parallel loop is executed again, thereby reducing the execution time of the parallel loop.

Meanwhile, as an alternative to the mP1L-mP2mL mode, an mP2mL performance prediction model is suggested. Using the mP2mL performance prediction model, the execution time in the mPmL mode is compared to the execution time in the mP2mL mode without executing the parallel loop in the mP2mL mode, to thereby determine which of the mPmL mode and the mP2mL mode is to be executed when the parallel loop is executed again. That is, if the new execution mode is the mP2mL mode, the execution time is not measured but instead is predicted by the following equations based on the number of executed instructions and the number of cache misses.

The execution time $T_{mP2mL}$ of the parallel loop in the mP2mL is predicted by Equation 3:

$$T_{mP2mL} = a \cdot N_{mP2mL}^{grad} + b \cdot N_{mP2mL}^{L2} + c \cdot N_{mP2mL}^{L3} + d \quad \text{[Equation 3]}$$

Here, a, b, c, and d denote constant coefficients of respective terms, and $N_{mP2mL}^{grad}$, $N_{mP2mL}^{L2}$, and $N_{mP2mL}^{L3}$ denote the number of executed instructions, the number of L2 cache misses, and the number of L3 cache misses in the mP2mL mode, respectively.

Since the number of executed instructions, the number of L2 cache misses, and the number of L3 cache misses in the mP2mL mode are proportional to in the mPmL mode, Equations 4 are possible:

$$N_{mP2mL}^{grad} = a^{grad} \cdot N_{mPmL}^{grad} + b^{grad}$$

$$N_{mP2mL}^{L2} = a^{L2} \cdot N_{mPmL}^{L2} + b^{L2}$$

$$N_{mP2mL}^{L3} = a^{L3} \cdot N_{mPmL}^{L3} + b^{L3} \quad \text{[Equation 4]}$$

Accordingly, when Equations 4 are substituted into Equation 3, Equation 5 is derived. The execution time in the mP2mL mode is obtained from the execution time in the mPmL mode by using Equation 5:

$$T_{mP2mL} = a \cdot a^{grad} \cdot N_{mPmL}^{grad} + b \cdot a^{L2} \cdot N_{mPmL}^{L2} + \quad \text{[Equation 5]}$$
$$c \cdot a^{L3} \cdot N_{mPmL}^{L3} + a \cdot b^{grad} + b \cdot b^{L2} + c \cdot b^{L3} + d =$$
$$a' \cdot N_{mP2mL}^{grad} + b' \cdot N_{mP2mL}^{L2} + c' \cdot N_{mP2mL}^{L3} + d'$$

Each constant value is experimentally obtained through a regression analysis for parallel loops remaining after the mP1L-mPmL adaptive execution step 552.

The overhead of directly measuring the execution time can be reduced by the prediction procedure.

As described above, the present invention provides the following effects.

The adaptive execution method according to the exemplary embodiment of the present invention can significantly improve the performance of the parallel program driven in the multithreaded processor-based parallel system.

Also, the performance prediction model used in the exemplary embodiment of the present invention can be utilized in different multithreaded processor-based parallel systems and thus can be useful in related research.

Also, the technique suggested by the exemplary embodiment of the present invention can be easily integrated with any existing parallel compiler because it operates automatically without user intervention and the optimizing procedure is performed on a source level.

Also, the adaptive execution method according to the exemplary embodiment of the present invention can easily achieve a performance improvement of a parallel program operating in different parallel systems as well as the multi-threaded processor-based parallel system if several parameters are changed without departing from the spirit and scope of the present invention.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A method of executing a parallel program in a parallel system having a plurality of physical processors, comprising the steps of:
    generating as many threads as the number of physical processors of the parallel system in order to execute at least one parallel loop contained in the parallel program;
    executing, by the generated threads, at least one single loop of each parallel loop;
    measuring an execution time, the number of executed instructions, and the number of cache misses for each parallel loop;
    determining an execution mode of each parallel loop by determining the number of threads used to execute each parallel loop based on the measured values; and
    allocating the threads to each physical processor according to the result of the determination to execute each parallel loop.

2. The method of claim 1, wherein each physical processor comprises two logical processors, and the two logical processors share at least one cache memory.

3. The method of claim 1, wherein the step of measuring the execution time is performed by measuring a time spent to execute each parallel loop in its entirety.

4. The method of claim 1, wherein the step of measuring the number of executed instructions is performed by measuring the number of instructions executed while completely executing a single loop in each parallel loop.

5. The method of claim 1, wherein the step of measuring the number of cache misses is performed by measuring the number of cache misses occurring while completely executing a single loop in each parallel loop.

6. The method of claim 2, before the step of executing the single loop, further comprising the step of predicting a computation amount of each loop in using components of the parallel system while compiling the parallel program.

7. The method of claim 6, wherein the execution mode is selected from among an execution mode (mP1L) for executing the parallel loop by one thread, an execution mode (mPmL) for executing the parallel loop by a number of threads equal to the number of physical processors in the parallel system, an execution mode (mP2mL) for executing the parallel loop by a number of threads equal to the number of logical processors in the parallel system, an execution mode (mP1L-mPmL) for selecting the mP1L mode or the mPmL mode as the execution mode whenever executing the parallel loop, and an execution mode (mPmL-mP2mL) for selecting the mPmL mode or the mP2mL mode as the execution mode whenever executing the parallel loop.

8. The method of claim 7, wherein the step of determining the execution mode comprises the steps of:
    (a) determining whether to predict the computation amount of each parallel loop while compiling the parallel program;
    (b) determining, when the computation amount of each parallel loop is predicted while compiling the parallel program, whether the predicted computation amount is smaller than a critical value;
    (c) determining, when the computation amount of each parallel loop is not predicted while compiling the parallel program, or the predicted computation amount is larger than the critical value, whether a computation amount predicted through the number of executed instructions measured is smaller than a critical value;
    (d) obtaining, when the number of executed instructions is greater than the critical value, a number of cache misses per instruction (MPI) value based on the number of executed instructions and the number of cache misses and determining whether the MPI value is greater than a critical value;
    (e) obtaining, when the MPI is smaller than the critical value, a number of cycles per instruction (CPI) value based on the number of executed instructions and the execution time and determining whether the CPI value is smaller than a critical value; and
    (f) determining, when the CPI value is greater than the critical value, whether the number of executed instructions measured is smaller than a critical value.

9. The method of claim 8, wherein the step of determining the execution mode comprises the steps of:
    determining the execution mode of a corresponding parallel loop as the mP1L mode when it is determined in step (b) that the computation amount is smaller than the critical value;
    determining the execution mode of a corresponding parallel loop as the mP1L mode when it is determined in step (c) that the number of executed instructions is smaller than the critical value;
    determining the execution mode of a corresponding parallel loop as the mPmL mode when it is determined in step (d) that the MPI value is greater than the critical value;
    determining the execution mode of a corresponding parallel loop as the mP2mL mode when it is determined in step (e) that the CPI value is smaller than the critical value;
    determining the execution mode of a corresponding parallel loop as the mP1L-mPmL mode when it is determined in step (f) that the number of executed instructions is smaller than the critical value; and
    determining the execution mode of a corresponding parallel loop as the mPmL-mP2mL mode when it is determined in step (f) that the number of executed instructions is greater than the critical value.

10. The method of claim 9, wherein the step of executing each parallel loop comprises the step of allocating one thread to one of the logical processors in the parallel system when the determined execution mode is the mP1L mode.

11. The method of claim 9, wherein the step of executing each parallel loop comprises the step of allocating each of m threads to one of the logical processors of each physical processor when the determined execution mode is the mPmL mode.

12. The method of claim 9, wherein the step of executing each parallel loop comprises the step of allocating each of 2m threads to each logical processor when the determined execution mode is the mP2mL mode.

13. The method of claim 9, wherein when the determined execution mode is the mP1L-mPmL mode or the mPmL-mP2mL mode, the step of executing each parallel loop comprises the steps of:
  (a) changing the execution mode before re-executing the parallel loop;
  (b) measuring the execution time while executing the parallel loop in the changed execution mode;
  (c) comparing the measurement to the execution time for the parallel loop of before the execution mode change;
  (d) changing the execution mode when the measurement is shorter than the execution time for the parallel loop of before the execution mode change;
  (e) maintaining the current execution mode if the measurement is longer than the execution time for the parallel loop of before the execution mode change; and
  (f) performing steps (b) to (e) until all parallel loops in the parallel loop are executed.

* * * * *